US009148558B2

United States Patent
Ogasahara et al.

(10) Patent No.: US 9,148,558 B2
(45) Date of Patent: Sep. 29, 2015

(54) CAMERA MODULE HAVING FIRST AND SECOND IMAGING OPTICAL SYSTEM CONTROLLED IN RELATION TO IMAGING MODES AND IMAGING METHOD

(71) Applicant: Kabushiki Kaisha Toshiba, Tokyo (JP)

(72) Inventors: Takayuki Ogasahara, Kanagawa (JP); Katsuo Iwata, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 13/771,559

(22) Filed: Feb. 20, 2013

(65) Prior Publication Data
US 2013/0278813 A1 Oct. 24, 2013

(30) Foreign Application Priority Data

Apr. 18, 2012 (JP) ................................. 2012-094731

(51) Int. Cl.
H04N 5/232 (2006.01)
H04N 5/225 (2006.01)
(52) U.S. Cl.
CPC ......... *H04N 5/23212* (2013.01); *H04N 5/2254* (2013.01); *H04N 5/23245* (2013.01)
(58) Field of Classification Search
CPC ..... H04N 5/23212; H04N 7/01; H04N 5/225; H04N 5/23296; H04N 5/23216
USPC ................. 348/345, 335, 240.3, 340
See application file for complete search history.

(56) References Cited

U.S. PATENT DOCUMENTS

| | | | |
|---|---|---|---|
| 2008/0118241 A1 | 5/2008 | TeKolste et al. | |
| 2008/0309813 A1* | 12/2008 | Watanabe | 348/340 |
| 2010/0066812 A1* | 3/2010 | Kajihara et al. | 348/46 |
| 2010/0128145 A1* | 5/2010 | Pitts et al. | 348/231.99 |
| 2010/0129048 A1* | 5/2010 | Pitts et al. | 386/52 |
| 2010/0141802 A1* | 6/2010 | Knight et al. | 348/240.3 |
| 2012/0002071 A1* | 1/2012 | Nishiyama | 348/222.1 |
| 2012/0236186 A1 | 9/2012 | Ogasahara | |
| 2012/0294590 A1* | 11/2012 | Pitts et al. | 386/282 |
| 2013/0235267 A1* | 9/2013 | Pitts et al. | 348/448 |

(Continued)

FOREIGN PATENT DOCUMENTS

| | | |
|---|---|---|
| JP | 3-184025 | 8/1991 |
| JP | 4-42207 | 2/1992 |
| JP | 2007-60647 | 3/2007 |

(Continued)

OTHER PUBLICATIONS

U.S. Appl. No. 13/530,595, filed Jun. 22, 2012, Takayuki Ogasahara, et al.

(Continued)

*Primary Examiner* — Antoinette Spinks
(74) *Attorney, Agent, or Firm* — Oblon, McClelland, Maier & Neustadt, L.L.P.

(57) ABSTRACT

According to one embodiment, in a first imaging mode, an imaging mode control unit allows a second imaging optical system to function in an optical path between an imaging unit and a first imaging optical system and stops focus adjustment. In a second imaging mode, the imaging mode control unit stops the function of the second imaging optical system and allows the focus adjustment to be performed. The first imaging optical system takes in a light from an object to the imaging unit. The second imaging optical system forms an image piece in each pixel block.

12 Claims, 8 Drawing Sheets

(56) References Cited

U.S. PATENT DOCUMENTS

2014/0016019 A1* 1/2014 Pitts et al. .................... 348/349
2015/0070474 A1* 3/2015 Bhat et al. ..................... 348/49

FOREIGN PATENT DOCUMENTS

| JP | 2009-169025 | 7/2009 |
| JP | 2010-510542 | 4/2010 |
| JP | 4777177 | 7/2011 |
| WO | WO 2008/063528 A2 | 5/2008 |

OTHER PUBLICATIONS

U.S. Appl. No. 13/361,304, filed Jan. 30, 2012, Takayuki Ogasahara.
Office Action issued Jun. 30, 2015 in Japanese Patent Application No. 2012-094731 (with English translation).

* cited by examiner

CAMERA MODULE HAVING FIRST AND SECOND IMAGING OPTICAL SYSTEM CONTROLLED IN RELATION TO IMAGING MODES AND IMAGING METHOD

CROSS-REFERENCE TO RELATED APPLICATIONS

This application is based upon and claims the benefit of priority from Japanese Patent Application No. 2012-094731, filed on Apr. 18, 2012; the entire contents of all of which are incorporated herein by reference.

FIELD

Embodiments described herein relate generally to a camera module and an imaging method.

BACKGROUND

Recently, a camera module having a compound-eye configuration capable of simultaneously photographing an object from a plurality of points of view has been proposed. The camera module can perform estimation of object distance and reconstruct a two-dimensional image through image connection by performing an image process for an image group photographed by using the compound-eye configuration. The camera module can obtain depth information of an object from a plurality of images according to different points of view. The camera module performs an image process, for example, refocusing or the like by using the depth information.

The camera module can obtain a high-resolution image though simple, easy operation by using an autofocusing function. In order for a user to photograph a desired image, it is preferable that the camera module is configured so that the refocusing function by the compound-eye configuration and the autofocusing function by an autofocusing mechanism can be separately used according to user's intention.

DETAILED DESCRIPTION

In general, according to one embodiment, a camera module is configured to include an imaging unit, a first imaging optical system, a second imaging optical system, a focus adjustment unit, and an imaging mode control unit. The imaging unit is configured to include pixel cells. The pixel cells are arranged in an array shape. The imaging unit images an object image. The first imaging optical system takes in a light from an object to the imaging unit. The second imaging optical system forms an image piece in each pixel block. The pixel block is configured to include a plurality of pixel cells. The image piece corresponds to a portion of the object image. The focus adjustment unit performs focus adjustment of the first imaging optical system. The imaging mode control unit controls driving of the second imaging optical system and the focus adjustment unit in the first imaging mode and the second imaging mode. In the first imaging mode, the imaging mode control unit allows the second imaging optical system to function in an optical path between the imaging unit and the first imaging optical system and stops the focus adjustment of the focus adjustment unit. In the second imaging mode, the imaging mode control unit stops the function of the second imaging optical system and performs the focus adjustment of the focus adjustment unit.

Exemplary embodiments of a camera module and an imaging method will be explained below in detail with reference to the accompanying drawings. The present invention is not limited to the following embodiments.

Figure 1:
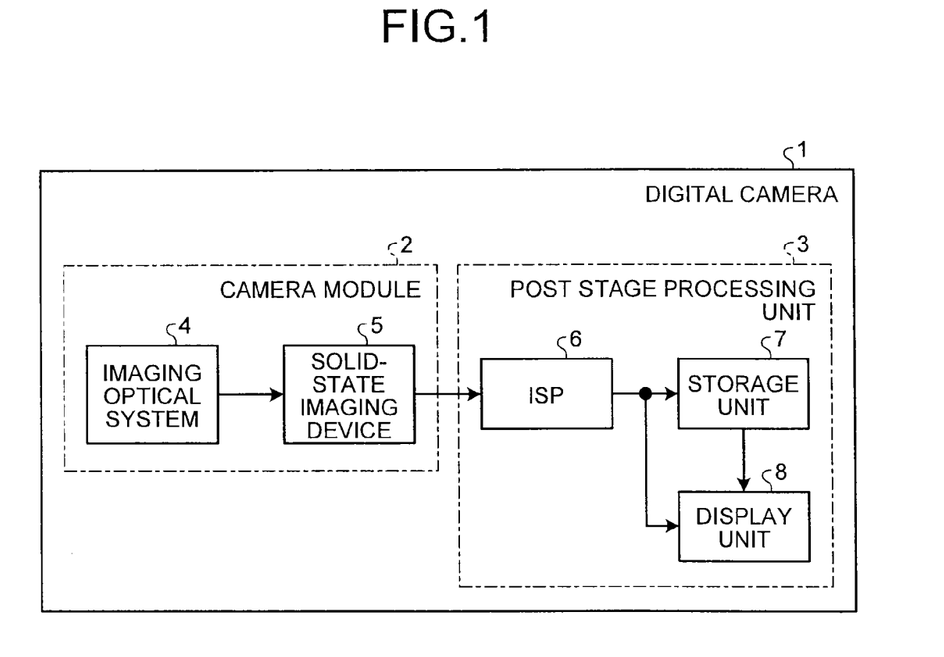
FIG. 1 is a block diagram illustrating a schematic configuration of a digital camera including a camera module according to a first embodiment.

FIG. 1 is a block diagram illustrating a schematic configuration of a digital camera including a camera module according to a first embodiment. A digital camera 1 is configured to include a camera module 2 and a post stage processing unit 3.

The camera module 2 is configured to include an imaging optical system 4 and a solid-state imaging device 5. The post stage processing unit 3 is configured to include an image signal processor (ISP) 6, a storage unit 7, and a display unit 8. In addition to the digital camera 1, the camera module 2 is applied to electronic apparatuses such as a camera-attached mobile terminal.

The imaging optical system 4 receives a light from an object to form an object image. The imaging optical system 4 includes a first imaging optical system and a second imaging optical system which are described below. The solid-state imaging device 5 images the object image to generate an image signal.

The ISP 6 performs a signal process on the image signal input from the solid-state imaging device 5. The storage unit 7 stores an image which is subjected to the signal process of the ISP 6. The storage unit 7 outputs the image signal to the display unit 8 according to user's operation or the like. The display unit 8 displays an image according to an image signal input from the ISP 6 or the storage unit 7. The display unit 8 is, for example, a liquid crystal display.

Figure 2:
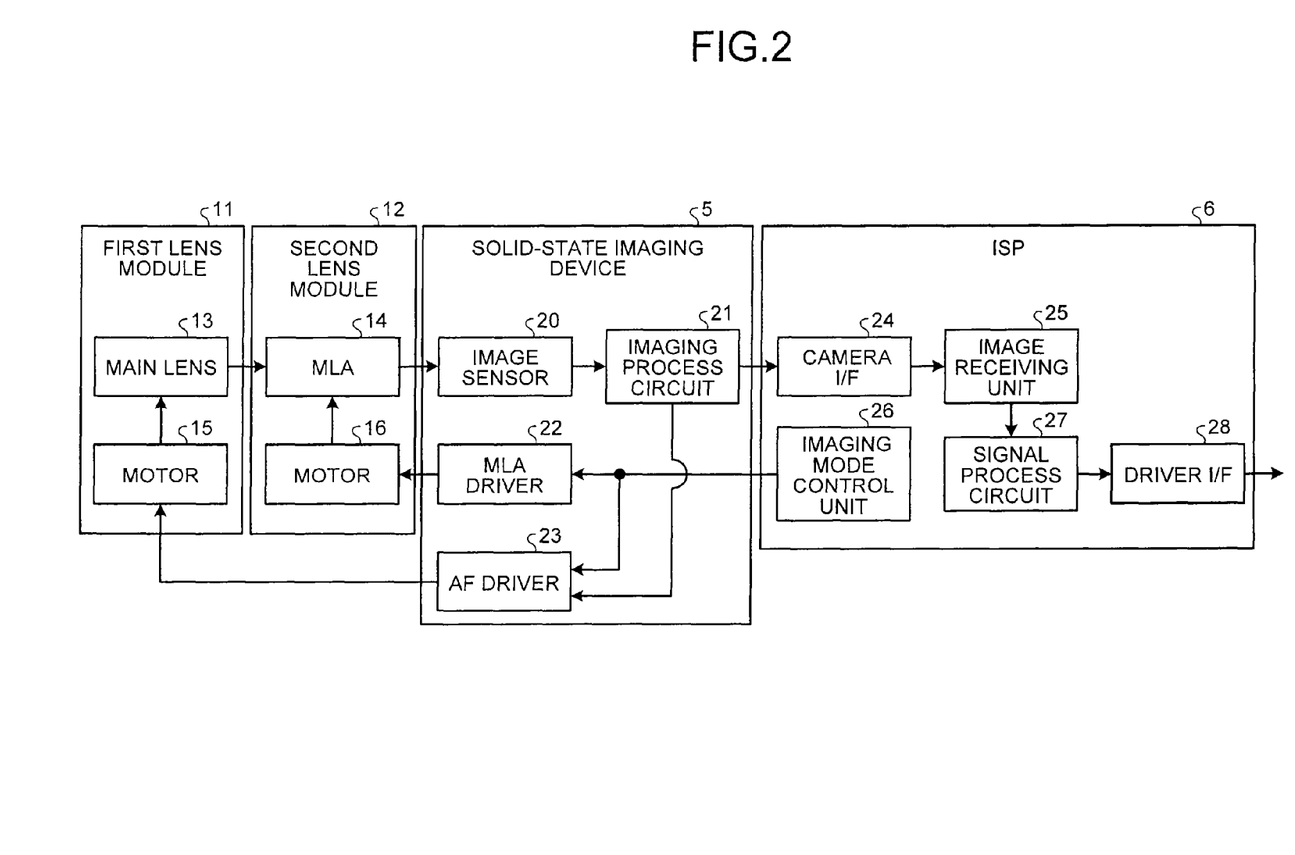
FIG. 2 is a block diagram illustrating a configuration of first and second lens modules, a solid-state imaging device, and an ISP.

FIG. 2 is a block diagram illustrating a configuration of first and second lens modules, a solid-state imaging device, and an ISP. The first lens module 11 is configured to include a main lens 13 and a motor 15. The main lens 13 constitutes the first imaging optical system. The main lens 13 takes in the light from the object to an image sensor 20. The motor 15 supplies a driving force for the focus adjustment of the main lens 13.

The second lens module 12 is configured to include a micro lens array (MLA) 14 and a motor 16. The MLA 14 constitutes the second imaging optical system. The MLA 14 is configured by arranging a plurality of lens elements in an array shape. The MLA 14 forms an image piece. The image piece corresponds to a portion of the object image. The motor 16 supplies a driving force for moving the MLA 14 to a first position and a second position which are described below.

The solid-state imaging device 5 is configured to include an image sensor 20, an imaging process circuit 21, a micro lens array (MLA) driver 22, and an autofocusing (AF) driver 23. The image sensor 20 is an imaging unit which images an object image. The image sensor 20 allows a photodiode to convert the light incident through the imaging optical system into signal charges to image the object image. The image sensor 20 is, for example, a CMOS (complementary metal oxide semiconductor) image sensor. In addition to the CMOS image sensor, the image sensor 20 may be a CCD (charge coupled device).

The imaging process circuit 21 performs a signal process on an image signal from the image sensor 20. The MLA driver 22 drives the motor 16 according to the control of the imaging mode control unit 26 described below.

The AF driver 23 detects a focused state by using a signal from the imaging process circuit 21 and drives the motor 15. The AF driver 23 and the motor 15 function as a focus adjustment unit which performs the focus adjustment of the first imaging optical system. The AF driver 23 performs focus adjustment of any one of a phase difference detection method and a contrast detection method. The AF driver 23 switches between performing and stopping of the focus adjustment according to the control of the imaging mode control unit 26.

The ISP 6 is configured to include a camera interface (I/F) 24, an image receiving unit 25, a signal process circuit 27, a driver interface (I/F) 28, and an imaging mode control unit 26. The camera I/F 24 receives an input of the image signal from the solid-state imaging device 5. The image receiving unit 25 receives the image signal input to the camera I/F 24.

The signal process circuit 27 performs a signal process on the image received by the image receiving unit 25. The driver I/F 28 outputs the image signal which is subjected to the signal process of the signal process circuit 27 to the storage unit 7 and the display unit 8 (see FIG. 1). The imaging mode control unit 26 controls the driving of second imaging optical system and the focus adjustment unit in the first imaging mode and the second imaging mode.

Figure 3:
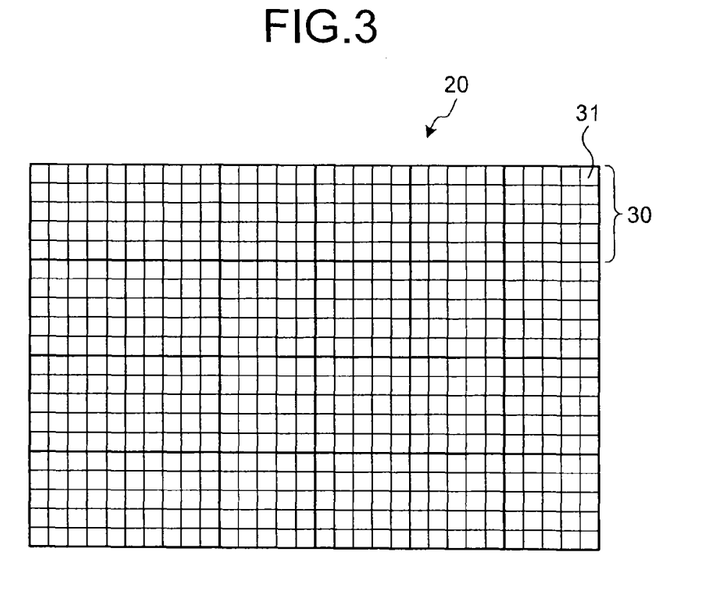
FIG. 3 is a schematic plan diagram illustrating an incidence side of an image sensor.

FIG. 3 is a schematic plan diagram illustrating an incidence side of an image sensor. The image sensor 20 is configured to include pixel cells 31 which are arranged in an array shape. Each pixel cell 31 includes a photodiode (not illustrated). Pixel blocks 30 including a plurality of the pixel cells 31 are set in the image sensor 20. For example, the pixel block 30 is configured to include 25 pixel cells 31 which are arranged in an array shape of five pixels in the row direction and five pixels in the column direction. In addition, the number of pixel cells 31 included in the pixel block 30 may be appropriately changed.

Figure 4:
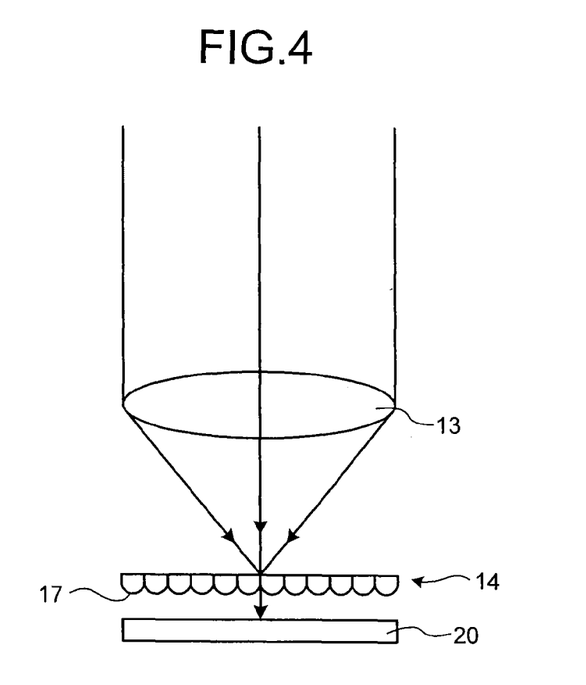
FIG. 4 is a schematic diagram illustrating a main lens, an MLA, and an image sensor in a first imaging mode.
Figure 5:
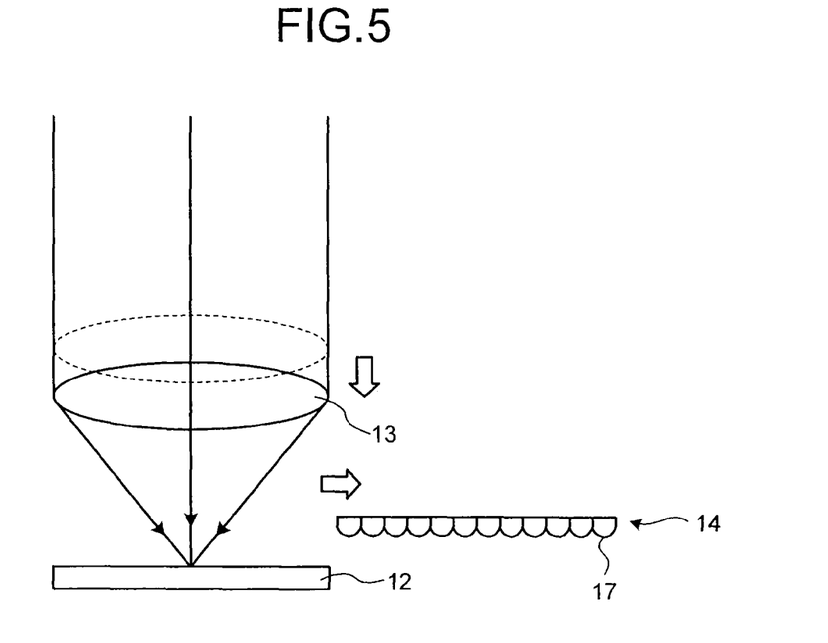
FIG. 5 is a schematic diagram illustrating a main lens, an MLA, and an image sensor in a second imaging mode.

FIG. 4 is a schematic diagram illustrating a main lens, an MLA, and an image sensor in the first imaging mode. FIG. 5 is a schematic diagram illustrating a main lens, an MLA, and an image sensor in the second imaging mode.

Lens elements 17 constituting the MLA 14 are installed corresponding to each of the pixel blocks 30. The lens element 17 forms the object image, which is formed by the main lens 13, as an image piece. The image piece corresponds to a portion of the object image. The MLA 14 forms an image piece in each pixel block 30. In addition, the arrangement of the lens elements 17 may be any one of a tetragonal lattice arrangement, a hexagonal close-packed arrangement, and the like.

In the first imaging mode, the MLA 14 is inserted into an optical path between the main lens 13 and the image sensor 20. The position where the MLA 14 is disposed in the first imaging mode is set as a first position. The first position is, for example, the position of the image forming plane of the main lens 13 in the first imaging mode.

In the second imaging mode, the MLA 14 is deviated from the optical path between the main lens 13 and the image sensor 20. The position where the MLA 14 is disposed in the second imaging mode is set as a second position. The second position is a position other than the first position. For example, the second position is a position which is shifted from the first position in a two-dimensional direction perpendicular to the optical axis. In addition, the second position may be any position which is deviated from the optical path between the main lens 13 and the image sensor 20.

When the imaging mode control unit 26 receives a command of changing the mode from the second imaging mode to the first imaging mode, the imaging mode control unit 26 controls the MLA driver 22 so as to move the MLA 14 from the second position to the first position. The imaging mode control unit 26 controls the AF driver 23 to move the main lens 13 so that the image forming plane of the main lens 13 is coincident with the incidence plane of the MLA 14. In the first imaging mode, the imaging mode control unit 26 stops the focus adjustment of the AF driver 23.

In the first imaging mode, the imaging mode control unit 26 allows the MLA 14 to function by inserting the MLA 14 into the first position and stops the focus adjustment of the AF driver 23.

When the imaging mode control unit 26 receives a command of changing the mode from the first imaging mode to the second imaging mode, the imaging mode control unit 26 controls the MLA driver 22 so as to move the MLA 14 from the first position to the second position. The imaging mode control unit 26 controls the AF driver 23 to move the main lens 13 so that the image forming plane of the main lens 13 is coincident with the light receiving plane of the image sensor 20. In the second imaging mode, the imaging mode control unit 26 performs the focus adjustment of the AF driver 23.

In the second imaging mode, the imaging mode control unit 26 stops the function of the MLA 14 by detaching the MLA 14 from the first position to the second position and moves the main lens 13 and performs the focus adjustment of the AF driver 23. In addition, with respect to the solid-state imaging device 5, when the mode is changed from the first imaging mode to the second imaging mode, the moving of the main lens 13 may be performed by the focus adjustment of the AF driver 23 instead of the control of the imaging mode control unit 26.

Figure 6:
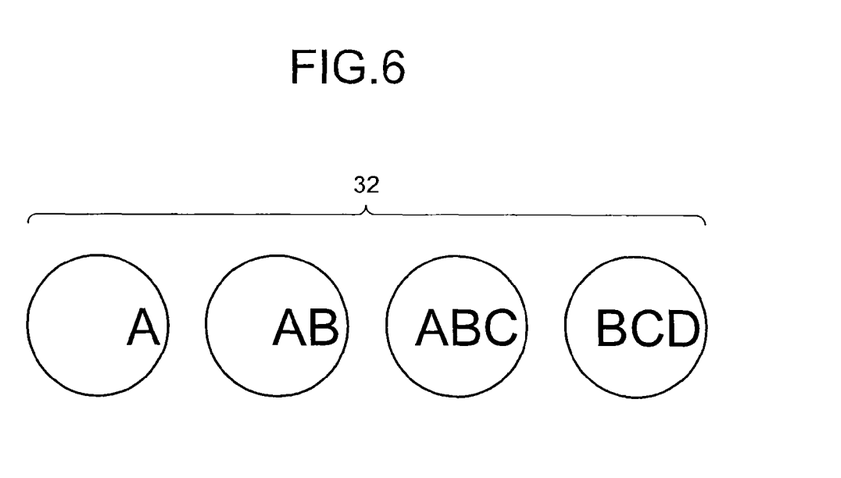
FIG. 6 is a diagram illustrating an image piece generated by an image sensor in a first imaging mode.
Figure 7:
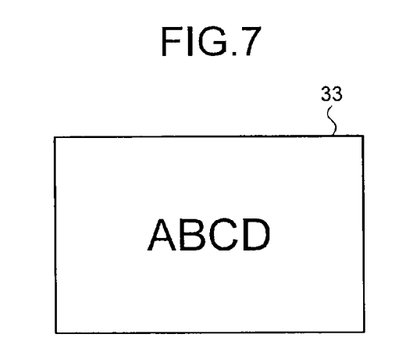
FIG. 7 is a diagram illustrating an object image reconstruction process by an ISP.

FIG. 6 is a diagram illustrating an image piece generated by an image sensor in the first imaging mode. FIG. 7 is a diagram illustrating an object image reconstruction process by an ISP. Herein, a case where a character string "ABCD" is imaged by the image sensor 20 and an object image reconstruction process is performed is exemplified.

The field of view where each lens element 17 forms the image piece 32 has an overlap range in the image forming plane of the main lens 13 according to a parallax. The character string "ABCD" is imaged by the image sensor 20 as an image piece 32 where overlapped portions are slight different from each other, for example, as illustrated in FIG. 6.

The signal process circuit 27 of the ISP 6 reconstructs an object image by connecting the image pieces 32 so that the overlapped portions are coincident with each other. The image piece 32 is reconstructed as the object image 33 including the character string "ABCD" as illustrated in FIG. 7 by a signal process for allowing each of the characters "A", "B", "C", and "D" to be coincident with each other.

The camera module 2 acquires depth information of the object by using the MLA 14 having a compound eye configuration. The digital camera 1 performs image refocusing by using the depth information of the object. In the case where the digital camera 1 photographs a moving object, the digital camera 1 can perform the focus adjustment as a post process by using a refocusing function. The first imaging mode is appropriate for photographing, for example, a moving picture.

The digital camera 1 can add a blur expression where, for example, background or the like is intentionally allowed to be out of focus to an image by using a refocusing function. The image refocusing process may be a process by a computer or the like which reads the image photographed by the digital camera 1 instead of the process by the digital camera 1.

The camera module 2 can obtain a focus-matched, high-resolution image at the same time of photographing by using the AF function. The second imaging mode is appropriate for photographing, for example, a still image.

In the first embodiment, the camera module 2 moves the MLA 14 to the first position and the second position and controls the position of the MLA 14 and the focus adjustment according to the imaging mode, so that the refocusing function by the compound eye configuration and the autofocusing function by the autofocusing mechanism can be separately used according to user's intention.

Figure 8:
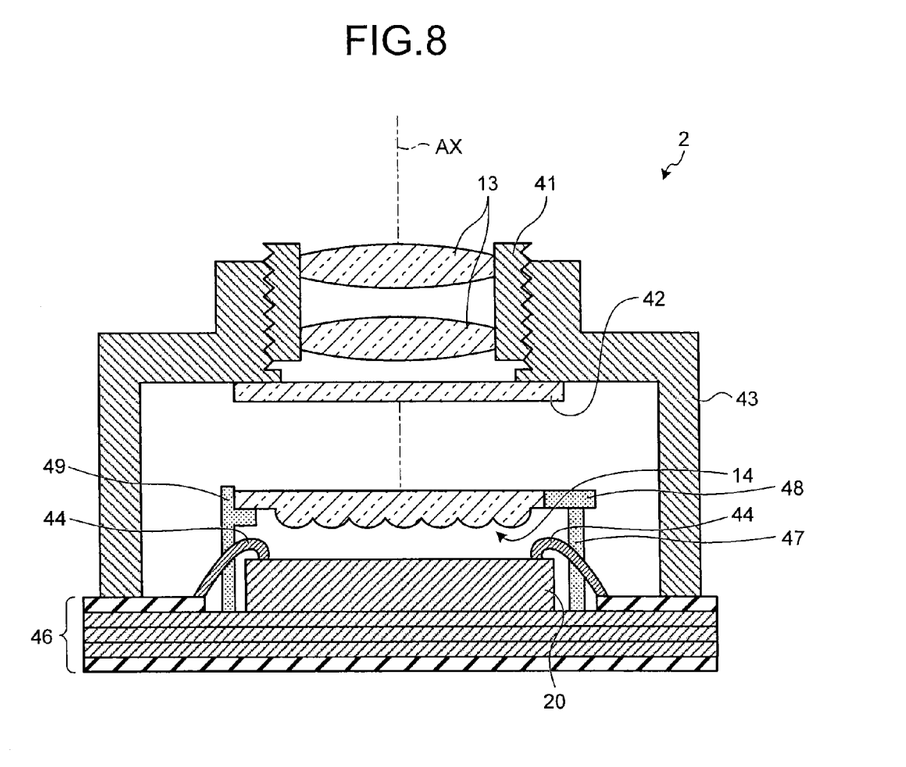
FIG. 8 is a schematic cross-sectional diagram illustrating an example of a partial configuration including an imaging optical system and an image sensor of a camera module.

FIG. 8 is a schematic cross-sectional diagram illustrating an example of a partial configuration including an imaging optical system and an image sensor of a camera module. A lens holder 41 holds each lenses constituting the main lens 13. An IR cutoff filter 42 blocks an infrared (IR) light and transmits a visible light.

The image sensor 20 is installed on a flexible substrate 46. The bonding wire 44 connects electrodes (not illustrated) and the image sensor 20 in the flexible substrate 46. An outer cover 43 covers portions where the image sensor 20 is installed in the flexible substrate 46, so that a space is formed inside thereof.

The lens holder 41 is inserted into an opening formed in the outer cover 43. The IR cutoff filter 42 is attached by blocking the opening from an inner side of the outer cover 43. In addition, the position of the IR cutoff filter 42 may be in an optical path from the object to the image sensor 20 and may be appropriately changed.

An MLA 14 is attached to a supporting portion 48. The supporting portion 48 is connected to a rotation shaft 47 erected on the flexible substrate 46. The rotation shaft 47 is rotated by a driving force of a motor 16 (see FIG. 2). The rotation shaft 47 rotates the MLA 14 for each supporting portion 48. The motor 16 and the rotation shaft 47 function as a rotation mechanism for moving the MLA 14 to the first position and the second position by rotating the MLA 14.

A stopper 49 erected on the flexible substrate 46 is abutted on the MLA 14 when the MLA 14 is at the first position. The motor 16 rotates the rotation shaft 47 until the MLA 14 is abutted on the stopper 49 when the MLA 14 is allowed to be moved from the second position to the first position.

Figure 9:
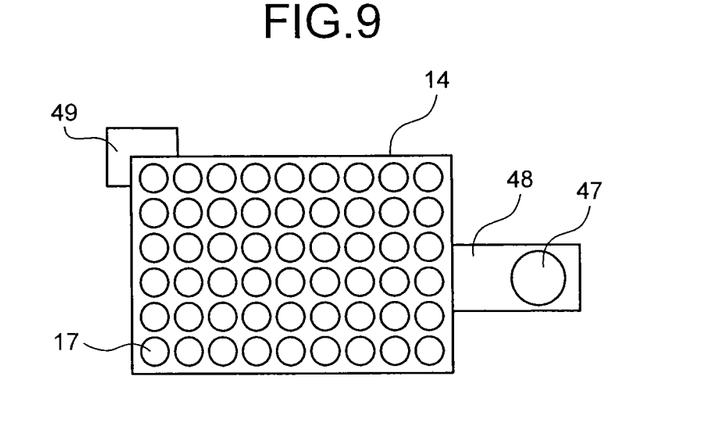
FIG. 9 is a schematic plan diagram illustrating an MLA and peripheral elements in a main lens side in a first imaging mode.
Figure 10:
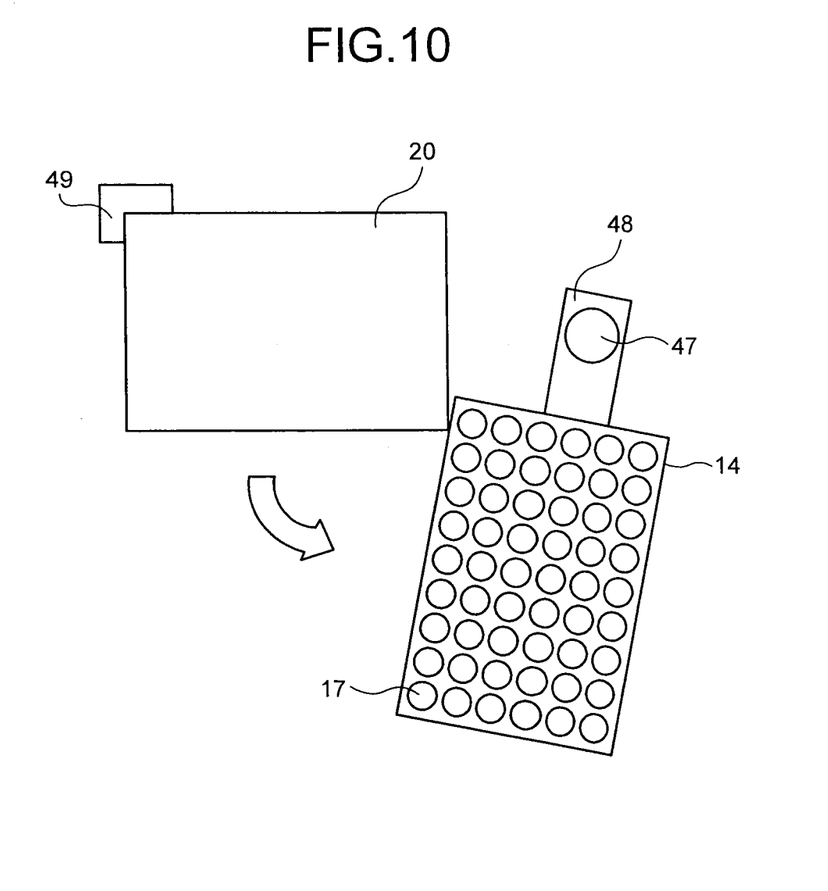
FIG. 10 is a schematic plan diagram illustrating an MLA and peripheral elements in a main lens side in a second imaging mode.

FIG. 9 is a schematic plan diagram illustrating an MLA and peripheral elements in a main lens side in the first imaging mode. FIG. 10 is a schematic plan diagram illustrating an MLA and peripheral elements in a main lens side in the second imaging mode. In the figures, the direction of the paper surface is set to a direction of a plane perpendicular to the optical axis of the imaging optical system. The MLA 14 is configured so that the MLA 14 can be rotated in the direction of the plane perpendicular to the optical axis with respect to the rotation shaft 47 as a center of rotation.

In the first imaging mode, the MLA 14 is abutted on the stopper 49, so that the position is fixed. If a command of changing the imaging mode from the first imaging mode to the second imaging mode is received, the MLA 14 is rotated from the first position on the image sensor 20 toward the second position. The MLA 14 is stopped at the second position. When the MLA 14 is at the second position, the MLA 14 is detached from the image sensor 20.

If a command of changing the imaging mode from the second imaging mode to the first imaging mode is received, the MLA 14 is rotated from the second position toward the first position. The MLA 14 is stopped at the first position where the MLA 14 is abutted on the stopper 49.

The MLA 14 is not limited to the case where the MLA is moved to the first position and the second position by the rotation mechanism. The MLA 14 may be an MLA which can be moved by any mechanism. The MLA 14 may be an MLA which is straightly moved to the first position and the second position, for example, by a straight movement mechanism instead of the rotation mechanism.

Figure 11:
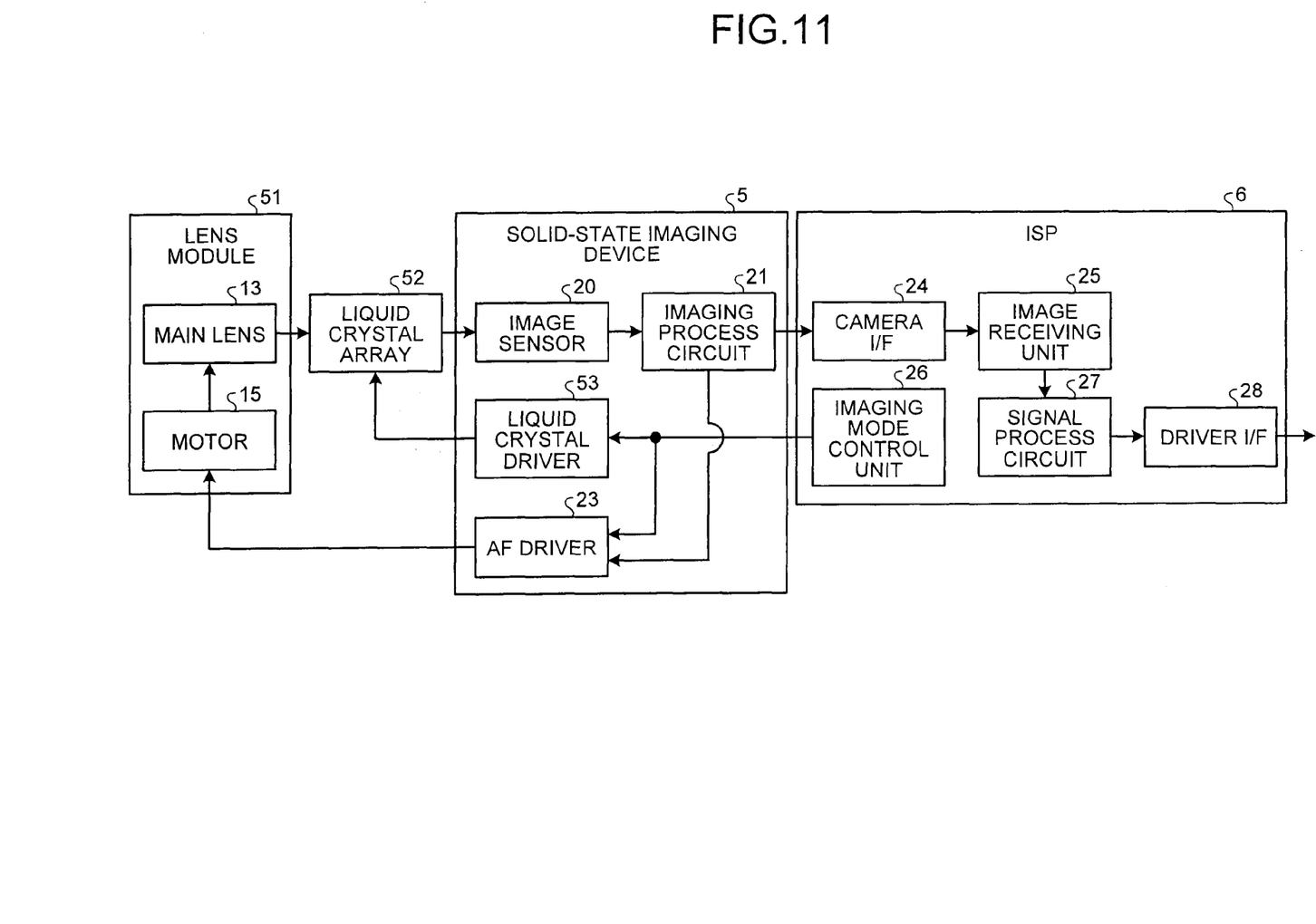
FIG. 11 is a block diagram illustrating a configuration of a lens module, a liquid crystal array, a solid-state imaging device, and an ISP of a camera module according to a second embodiment.

FIG. 11 is a block diagram illustrating a configuration of a lens module, a liquid crystal array, a solid-state imaging device, and an ISP of a camera module according to a second embodiment. The camera module according to the embodiment is applied to an electronic apparatus such as a digital camera 1 (see FIG. 1) or a camera-attached mobile terminal. The same elements as those of the first embodiment are denoted by the same reference numerals, and the description thereof is not presented.

The lens module 51 is configured to include a main lens 13 and a motor 15. The liquid crystal array 52 is installed at a position in an optical path between the main lens 13 and the image sensor 20, for example, a position on an image forming plane of the main lens 13 in the first imaging mode. The liquid crystal array 52 constitutes the second imaging optical system. The liquid crystal array 52 is configured by arranging a plurality of liquid crystal elements in an array shape. In the liquid crystal element, a light deflection characteristic is allowed to vary with orientation of liquid crystal molecules.

The solid-state imaging device 5 is configured to include an image sensor 20, an imaging process circuit 21, an AF driver 23, and a liquid crystal driver 53. The liquid crystal driver 53 drives the liquid crystal array 52 according to the control of the imaging mode control unit 26. The imaging mode control unit 26 controls the driving of the second imaging optical system and the focus adjustment unit in the first imaging mode and the second imaging mode.

Figure 12:
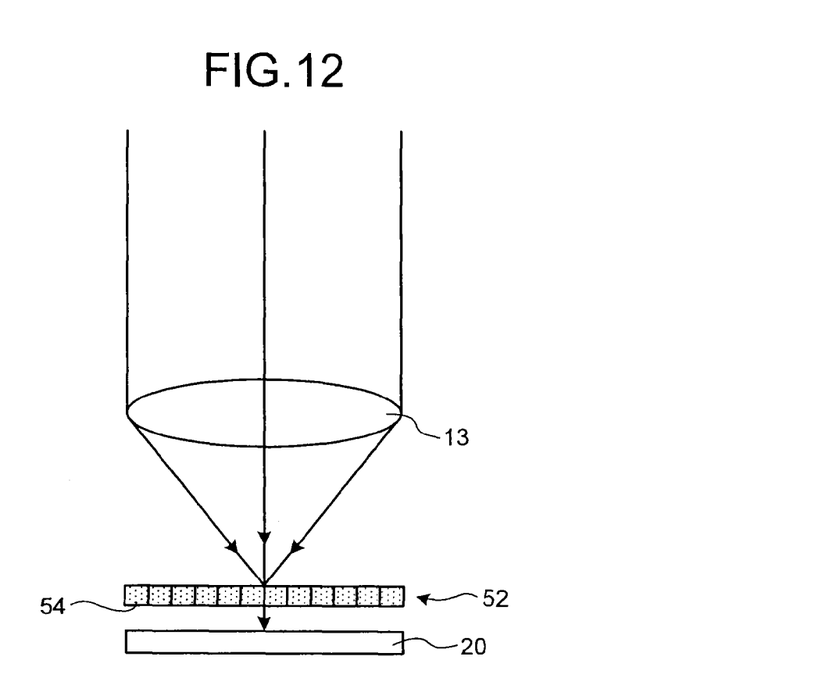
FIG. 12 is a schematic diagram illustrating a main lens, a liquid crystal array, and an image sensor in a first imaging mode.
Figure 13:
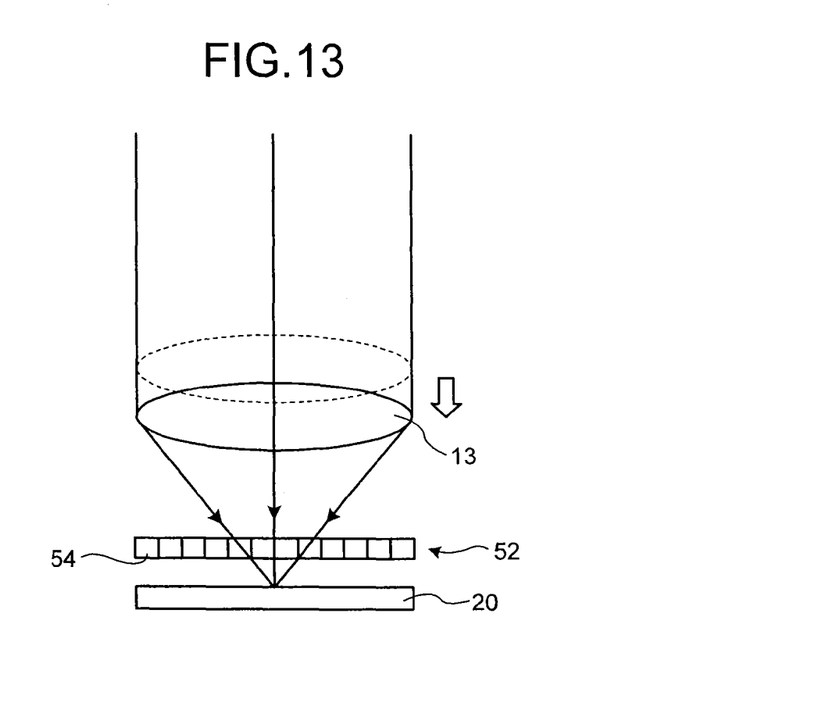
FIG. 13 is a schematic diagram illustrating a main lens, a liquid crystal array, and an image sensor in a second imaging mode.

FIG. 12 is a schematic diagram illustrating a main lens, a liquid crystal array, and an image sensor in the first imaging mode. FIG. 13 is a schematic diagram illustrating a main lens, a liquid crystal array, and an image sensor in the second imaging mode.

Liquid crystal elements 54 constituting a liquid crystal array 52 are installed corresponding to each of the pixel blocks 30 (see FIG. 3). The imaging mode control unit 26 controls a voltage applied to each of the liquid crystal elements 54 so as to activate a deflecting function for forming an image piece in the first imaging mode and so as to stop the deflecting function in the second imaging mode.

For example, in the first imaging mode, the liquid crystal driver 53 continuously applies the voltage to the liquid crystal array 52. During the voltage application, the liquid crystal elements 54 deflect a light beam from the main lens 13. In the first imaging mode, the deflecting function of each liquid crystal element 54 for forming an image piece is activated.

For example, in the second imaging mode, a liquid crystal driver 53 stops applying of the voltage to the liquid crystal array 52. During the stoppage of the voltage application, the liquid crystal element 54 does not deflect a light beam from the main lens 13 but allows the light beam to straightly propagate in the direction when the light beam is incident from the main lens 13. In the second imaging mode, the deflecting function of each liquid crystal element 54 for forming an image piece is stopped.

If a command of changing the imaging mode from the second imaging mode to the first imaging mode is received, the imaging mode control unit 26 controls the liquid crystal driver 53 so that voltage application to the liquid crystal array 52 is started. The imaging mode control unit 26 controls the AF driver 23 to move the main lens 13 so that the image forming plane of the main lens 13 is coincident with, for example, the incidence plane of the liquid crystal elements 54. In the first imaging mode, the imaging mode control unit 26 stops the focus adjustment of the AF driver 23.

In the first imaging mode, the imaging mode control unit 26 allows the liquid crystal array 52 to function by applying a voltage to the liquid crystal array 52 and stops the focus adjustment of the AF driver 23.

If a command of changing the imaging mode from the first imaging mode to the second imaging mode is received, the imaging mode control unit 26 controls the liquid crystal driver 53 so that the voltage application to the liquid crystal array 52 is stopped. The imaging mode control unit 26 controls the AF driver 23 to move the main lens 13 so that the image forming plane of the main lens 13 is coincident with the light receiving plane of the image sensor 20. In the second imaging mode, the imaging mode control unit 26 performs the focus adjustment of the AF driver 23.

In the second imaging mode, the imaging mode control unit 26 stops the deflecting function for forming an image piece of the liquid crystal array 52 and moves the main lens 13 and performs the focus adjustment of the AF driver 23. In addition, with respect to the solid-state imaging device 5, when the mode is changed from the first imaging mode to the second imaging mode, the moving of the main lens 13 may be performed by the focus adjustment of the AF driver 23 instead of the control of the imaging mode control unit 26.

During the stoppage of the voltage application, the liquid crystal element 54 does not deflect a light beam from the main lens 13; but during the voltage application, the liquid crystal element may deflect the light beam from the main lens 13. In this case, in the first imaging mode, the liquid crystal driver 53 stops applying a voltage to the liquid crystal array 52; and in the second imaging mode, the liquid crystal driver 53 continuously applies a voltage to the liquid crystal array 52.

In the second embodiment, the camera module 2 is configured to include the liquid crystal array 52, and the voltage applied to the liquid crystal array 52 and the focus adjustment are controlled according to the imaging mode, so that the refocusing function by the compound-eye configuration and the autofocusing function by the autofocusing mechanism can be separately used according to user's intention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera module comprising:
   an imaging unit which is configured to include pixel cells arranged in an array shape and images an object image;
   a first imaging optical system which takes in a light from an object to the imaging unit;
   a second imaging optical system which forms an image piece corresponding to a portion of the object image in each pixel block which is configured to include a plurality of the pixel cells;
   a focus adjustment unit which performs focus adjustment of the first imaging optical system; and
   an imaging mode control unit which controls driving of the second imaging optical system and the focus adjustment unit in a first imaging mode and a second imaging mode,
   wherein in the first imaging mode, the imaging mode control unit allows the second imaging optical system to function in an optical path between the imaging unit and the first imaging optical system and stops the focus adjustment of the focus adjustment unit,
   in the second imaging mode, the imaging mode control unit stops the function of the second imaging optical system and allows the focus adjustment unit to perform the focus adjustment,
   when a mode is changed from the second imaging mode to the first imaging mode, the focus adjustment unit moves the first imaging optical system based on control of the imaging mode control unit, an incidence plane of the second imaging optical system being coincident with an image forming plane of the first imaging optical system which has been moved, and
   when a mode is changed from the first imaging mode to the second imaging mode, the focus adjustment unit moves the first imaging optical system based on control of the imaging mode control unit, a light receiving plane of the imaging unit being coincident with the imaging forming plane of the first imaging optical system which has been moved.

2. The camera module according to claim 1, wherein the second imaging optical system is configured to include a micro lens array where a plurality of lens elements which forms the image piece is arranged in an array shape.

3. The camera module according to claim 2,
   wherein in the first imaging mode, the imaging mode control unit inserts the micro lens array into a first position as the optical path between the imaging unit and the first imaging optical system, and
   in the second imaging mode, the imaging mode control unit moves the micro lens array from the first position to a second position other than the first position.

4. The camera module according to claim 3, further comprising a rotation mechanism which rotates the micro lens array to the first position and the second position.

5. The camera module according to claim 1, wherein the second imaging optical system is configured to include a liquid crystal array which is installed in the optical path between the imaging unit and the first imaging optical system.

6. The camera module according to claim 5,
wherein the liquid crystal array is configured so that a plurality of liquid crystal elements, of which a light deflection characteristic is allowed to vary with orientation of liquid crystal molecules, is arranged in an array shape, and the imaging mode control unit controls a voltage applied to the liquid crystal elements so that, in the first imaging mode, a deflection function which forms the image piece is activated and, in the second imaging mode, the deflection function is stopped.

7. An imaging method of imaging an object image by an imaging unit including pixel cells arranged in an array shape, comprising:
allowing a first imaging optical system to allow a light from an object;
allowing a second imaging optical system to form an image piece corresponding to a portion of the object image in each pixel block which is configured to include a plurality of the pixel cells;
performing focus adjustment of the first imaging optical system; and
performing imaging mode control for controlling driving of the second imaging optical system and the focus adjustment in a first imaging mode and a second imaging mode,
wherein, as the imaging mode control in the first imaging mode, the second imaging optical system in an optical path between the imaging unit and the first imaging optical system is allowed to function, and the focus adjustment is stopped,
the imaging mode control in the second imaging mode, the function of the second imaging optical system is allowed to be stopped, and the focus adjustment is performed,
when a mode is changed from the second imaging mode to the first imaging mode, is the first imaging optical system is moved based on the imaging mode control, an incidence plane of the second imaging optical system being coincident with an image forming plane of the first imaging optical system which has been moved, and when a mode is changed from the first imaging mode to the second imaging mode, the first imaging optical system is moved based on the imaging mode control, a light receiving plane of the imaging unit being coincident with the imaging forming plane of the first imaging optical system which has been moved.

8. The imaging method according to claim 7, wherein a micro lens array where a plurality of lens elements which forms the image piece is arranged in an array shape is used as the second imaging optical system.

9. The imaging method according to claim 8,
wherein in the first imaging mode, the micro lens array is inserted into a first position as the optical path between the imaging unit and the first imaging optical system, and
in the second imaging mode, the micro lens array is moved from the first position to a second position other than the first position.

10. The imaging method according to claim 9, further comprising rotating the micro lens array to the first position and the second position.

11. The imaging method according to claim 7,
wherein a liquid crystal array is used as the second imaging optical system, and
the liquid crystal array is installed in the optical path between the imaging unit and the first imaging optical system.

12. The imaging method according to claim 11,
wherein the liquid crystal array is configured so that a plurality of liquid crystal elements, of which a light deflection characteristic is allowed to vary with orientation of liquid crystal molecules, is arranged in an array shape,
the imaging mode control in the first imaging mode, a voltage applied to the liquid crystal elements is controlled so that a deflection function which forms the image piece is activated, and
the imaging mode control in the second imaging mode, the voltage applied to the liquid crystal elements is controlled so that the deflection function is stopped.

* * * * *